United States Patent

[11] 3,631,673

| [72] | Inventors | Andre Georges Charrier<br>Saint-Cloud;<br>Jean Marius Mascarello, Versailles;<br>Georges Alfred Rigollot, Paris, all of France |
|---|---|---|
| [21] | Appl. No. | 61,310 |
| [22] | Filed | Aug. 5, 1970 |
| [45] | Patented | Jan. 4, 1972 |
| [73] | Assignee | Electricite De France (Service National), Paris, France |
| [32] | Priority | Aug. 8, 1969 |
| [33] | | France |
| [31] | | 6927390 |

[54] POWER GENERATING PLANT
6 Claims, 3 Drawing Figs.

[52] U.S. Cl. .................................... 60/39.18 B, 60/39.02, 290/52
[51] Int. Cl. .................................... F02c 1/04
[50] Field of Search .......................... 60/39.18 B, 39.02, 39.03, 39.04; 290/1, 2, 52

[56] References Cited
UNITED STATES PATENTS

| 1,846,389 | 2/1932 | Gay | 60/39.18 B |
| 3,151,250 | 9/1964 | Carlson | 290/52 |
| 3,325,992 | 6/1967 | Sheldon | 122/7 |
| 3,394,265 | 7/1968 | Hendrickson | 290/2 |
| 3,422,800 | 1/1969 | La Haye | 122/7 |

FOREIGN PATENTS

| 1,113,350 | 3/1956 | France | 290/1 |

*Primary Examiner*—Douglas Hart
*Assistant Examiner*—Warren Olsen
*Attorney*—Kenyon & Kenyon Reilly Carr & Chapin ABSTRACT: A method for generating power during peak-load hours and accumulating energy during minimum-load hours, in which during minimum-load hours, air is conpressed, refrigerated and accumulated under pressure in storage tanks, and during peak hours power is recovered in turbines which are supplied with compressed air by said storage tanks, wherein during peak hours, the air compressors used in the accumulating period for the storing of compressed air, are fed with external air which is refrigerated by a counterflow of cold air proceeding from said storage tanks, and the two pressurized airflows are mixed and conveyed to said turbines for generating power.

POWER GENERATING PLANT

The present invention has essentially for its object a plant for generating power during peak-load hours and accumulating energy during minimum-load hours, of the type comprising gas turbines, compressors, a refrigerating unit, a refrigerated pressurized-air storage tank, and wherein the compressors and the tank ensure parallel feeding of the turbines during the power generation period, whereas during the energy storage period the compressors and the refrigerating unit feed the tank with pressurized cold air.

There are many advantages in storing refrigerated pressurized air during minimum-load hours, e.g., at a temperature of $-50°$ C. and in using the negative calories in expansion in order to cool the air of another compression.

Indeed, during the peak period:

the energy accumulated by way of storage of pressurized air may be recovered through expansion in the turbines;

since the air is stored at a low temperature, a larger amount or mass of air may be stored in a given tank volume;

with a given volumetric rate of flow of the air introduced into the plant at a low temperature, the lower the temperature of the admitted air the higher the mass rate of flow. Considerably greater power may therefore be obtained from a plant comprising gas turbines as compared to that generated by a similar plant fed with air at atmospheric temperature.

The present invention has for its object improvements to power generating plants of the aforementioned general type.

A plant according to the invention is characterized in particular by the fact that in order to feed the turbines during the power generation period, the low-pressure stages of the compressors are fed with external air which is refrigerated at least partially by a counterflow of stored cool air supplied by the tank and introduced into the turbine feed circuit subsequent to countercurrent heating of the airflow issuing from the said low-pressure stages, the said flow being thereafter admitted into the medium-pressure stages of the compressors and issuing therefrom to be mixed with the heated air proceeding from the tank and conveyed to the turbines.

The plant advantageously comprises means for supplying liquefied natural gas to the turbines, and heat exchangers which deliver to the air flow admitted at the inlet of the compressors the cooling effect available as a result of the vaporization of the liquified natural gas feeding the turbines.

In this manner, a great number of advantages are obtained owing to the interconnection of the various said plants which, while operating, so act upon one another as to mutually improve their operation.

Thus, the refrigerating effect from the cool air stored in the tank and from the vaporization of the liquefied natural gas are used to cool the external air which is admitted into the compressors and thereafter into the turbines. Under such conditions, the mass rate of flow and the pressure at the inlet of the turbines are increased and the specific consumption is improved;

the heating of the cool air stored in the tank is achieved by the counterflow of air issuing from the low-pressure stages of the compressors. The heat energy consumed in these low-pressure stages is therefore recovered directly in the cycle;

the storage of natural gas in the form of liquified natural gas, which may be achieved during minimum-load hours is of interest owing to both the small-capacity storage tanks required and the cooling effect available from the liquified natural gas which is used to cool the compressed air admitted into the compressors. Moreover, the plant temperature, not overburden the natural gas supply means, thus enabling to avoid the laying of special and costly natural-gas supply means. In addition, the feeding of the turbines with natural gas is quite advantageous from the chemical point of view and enables to operate the turbines under excellent conditions.

Moreover, where such a feeding is used for the gas turbines, the exhaust gases issuing from the latter may be injected directly into the tubes of a steam boiler. In this case, the oxygen content of the exhaust gases is indeed sufficient. It may be obtained simply by introducing dilution air at a sufficient high temperature, e.g. not less than $175°$ C., into the head chamber of the gas turbine. In a plant of the type described, this is obtained automatically. The plant may therefore be followed by a steam plant which will give the plant as a whole the advantages inherent to combined gas-steam cycles.

The invention is also directed to a method carried out by a plant of the type described, characterized in that during minimum-load hours the refrigerated air is accumulated under pressure in the storage tanks and, advantageously, liquefied natural gas is stored in the form of liquefied natural gas in a tank, whereas during peak-load hours, in a first phase of operation, the low-pressure and medium-pressure stages of the air compressors are fed with external air which is first refrigerated by a counterflow of cold air proceeding from the storage tank and then by the cooling effect available as a result of the vaporization of the liquefied natural gas, the compressed hot air issuing from the low-pressure stages of the compressors ensuring counterflow heating in an exchanger of the said flow of cold air proceeding from the tank, and thereafter the two flows of pressurized air issuing in the hot state from the medium-pressure stages of the compressors and the said exchanger proceeding from the tank are mixed and conveyed to the turbines in which they are heated through combustion with the vaporized liquefied gas, and then expanded, the hot gases issuing from the turbines being recovered to feed the steam boilers with hot combustive gas.

The invention will appear more clearly from the following description with reference to the appended diagrams which illustrate only by way of example a plant and the method carried out by means of the latter according to the invention.

In these diagrams:

Figure 1:
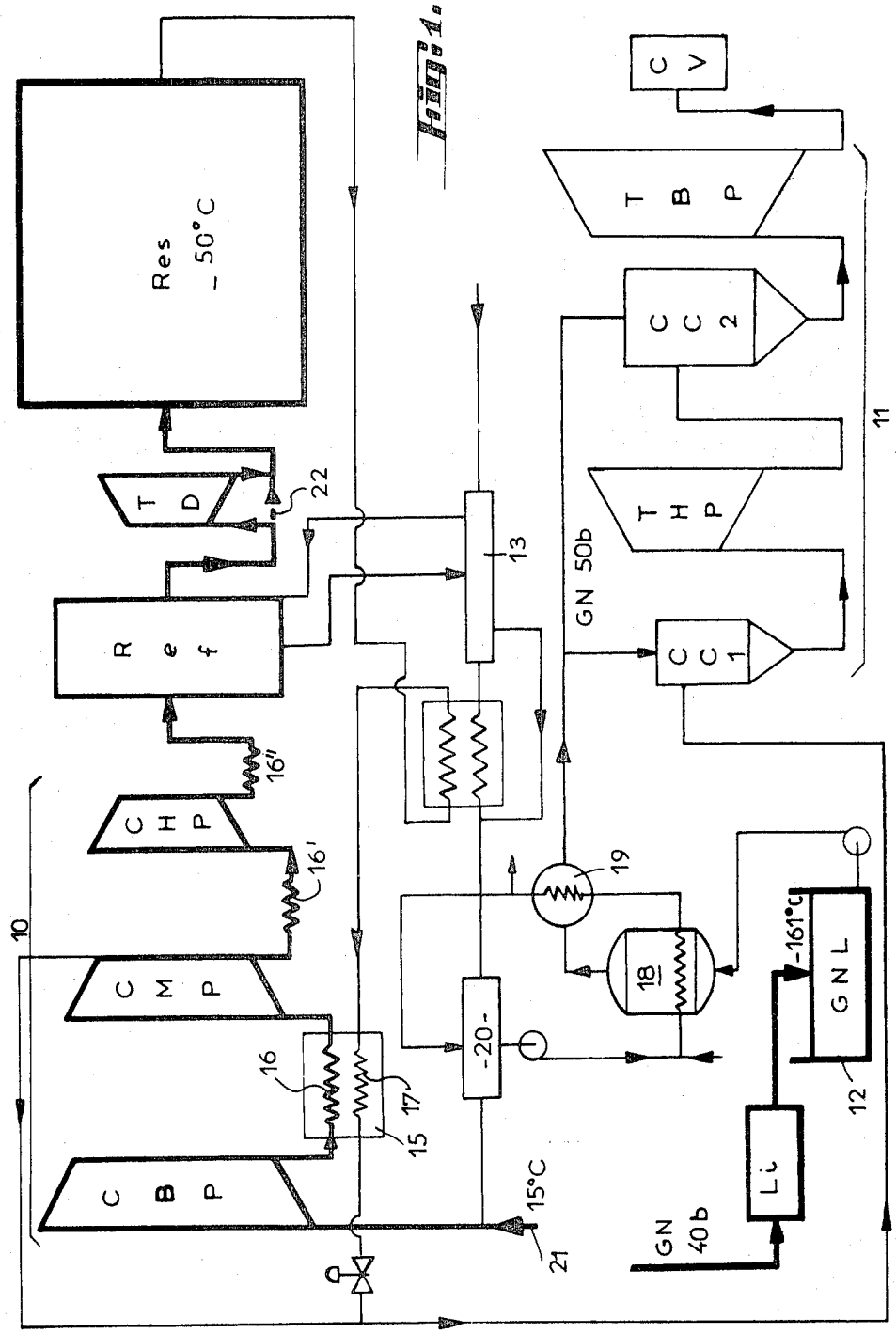
FIG. 1 illustrates the operation of the plant during minimum-load hours, i.e., usually by night.

In each of the diagrams there are shown in thick lines the various assemblies and circuits actually used during the considered phase of operation of the plant, while the remainder of the plant at rest is shown by a thinner line.

According to the form of embodiment illustrated in the diagrams, the plant comprises essentially:

an air compression unit 10 comprising the low-pressure stages C B P, the medium-pressure stages C M P and the high-pressure stages C H P of the compressors, a compressed-air refrigeration unit R*ef*, an expansion turbine TD for lowering the air storage temperature in a tank R*es*, power generating gas turbines 11 divided into two stages, namely respectively a high-pressure stage comprising a combustion chamber CC1 and a high-pressure turbine THP and a low-pressure stage comprising a combustion chamber CC2 and a low-pressure turbine TBP, a liquefaction unit L*i* for the natural gas GN supplied for instance under a pressure of 40 atmospheres by the supply network; the unit L*i* supplies liquefied natural gas GNL which is stored under atmospheric pressure at $-160°$ C. in a suitably heat-insulated tank 12, a steam plant supplying power and only the boilers CV of which are shown in the drawing, the said boilers being fed with hot combustive gas by the exhaust gases proceeding from the low-pressure turbine TBP, heat exchangers or similar units denoted 13 to 20 in the diagrams, the interest and the mode of use of which will appear later.

The operation of the plant will now be described.

1. Energy storage during minimum-load hours (operation by night).

Reference is made more particularly to FIG. 1.

Ambient air is drawn for instance at 15° C. at 21 by the low-pressure stages CBP of the compression unit 10. The compressed air issuing from the stages CBP subsequent to cooling in an exchanger 16 fed for instance with cold water is sucked by the medium-pressure stages CMP of the unit 10; the air issuing from the stages CMP subsequent to cooling in an exchanger 16' is compressed in the high-pressure stages CHP. At its exit, the air under high pressure is cooled in an exchanger 16''. The final pressure of the air supplied by the stages CHP may be for instance on the order of 70 to 110 atmospheres.

The air under high pressure proceeding from the compression unit 10 passes in a refrigeration unit Ref and thereafter in an expansion turbine TD so as to lower its temperature. The air is finally stored in a tank Res at a low temperature and under high pressure.

At the end of the storage, the tank Res may thus be filled with compressed air at −50° C. under a pressure of 80 to 100 atmospheres. In order to increase the pressure in the tank at the end of the filling, the expansion turbine TD is shunted at the end of this energy storage phase as indicated in dashed lines at 22. The pressure prevailing in the tank may then reach, except for the pressure loss in the conduits, the exchanger 16'' and the refrigeration plant Ref, the outlet pressure of the high-pressure stages CHP of the compression unit 10.

Simultaneously with the storage of the pressurized refrigerated air in the tank Res, a unit Li liquefies the natural gas GN proceeding for instance under a pressure of 40 atmospheres from the supply network which during minimum-load hours is not loaded. The liquefied natural gas GNL is then stored at substantially the atmospheric pressure in a tank 12 at −161° C. 2. Power supply during peak hours (by day).

a. first phase

Figure 2:
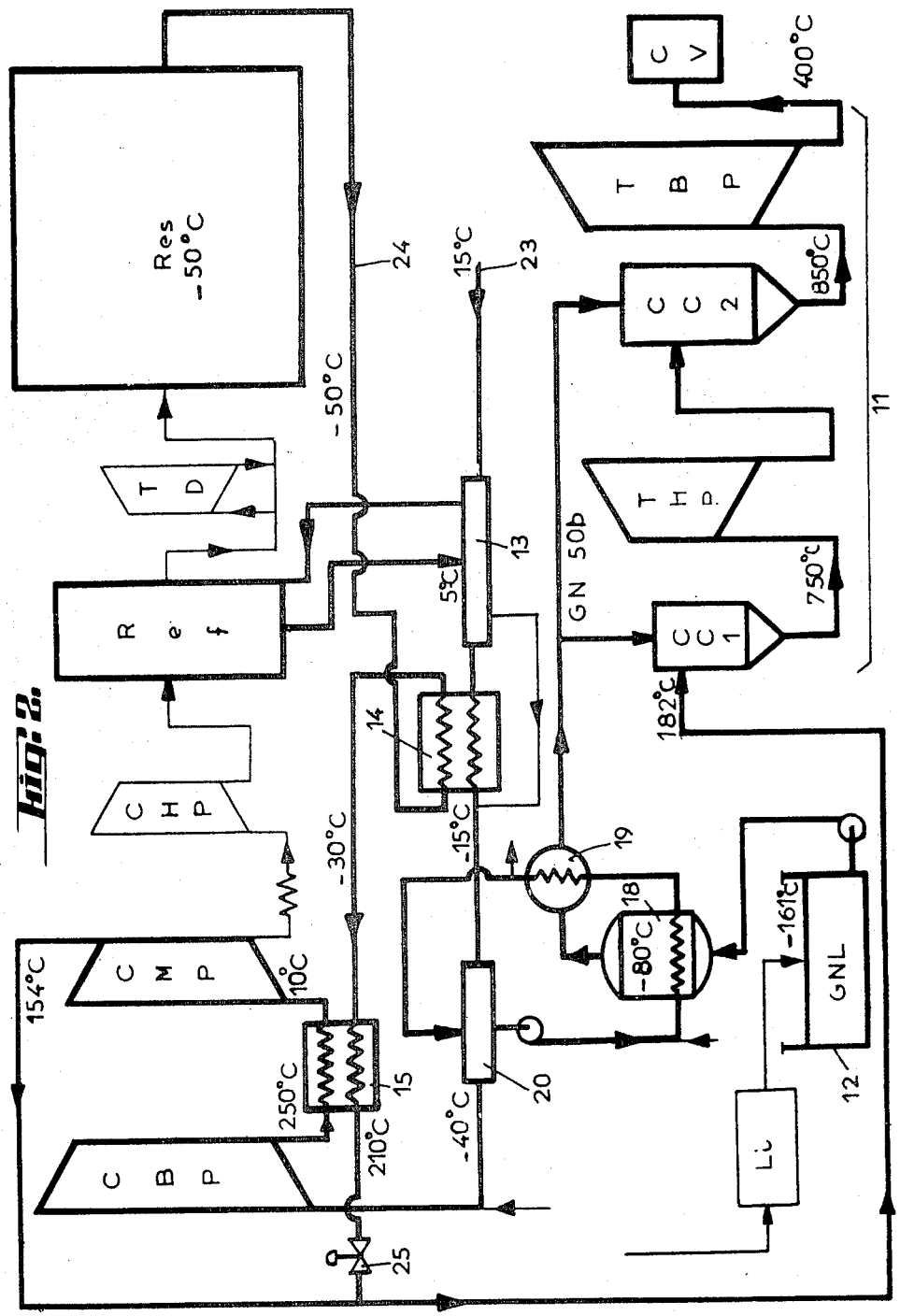
FIG. 2 illustrates the operation of the plant during peak-hours, i.e., usually by day and during a first phase of operation.

Reference is now made to FIG. 2. At the beginning of the power supply phase, the tank Res is full with compressed air at low temperature, and the tank 12 is full with liquefied natural gas.

During this first phase, the power supplied by the plant is delivered respectively by the high-pressure stage THP and the low-pressure stage TBP of the turbines 11. Another portion of the power supplied by the plant is also delivered by the steam cycle following the gas cycle illustrated. In the diagram of FIG. 2, only the steam boilers CV are shown in the steam cycle, the tubes of which are fed with the hot gases proceeding from the low-pressure turbine TBP.

The feeding of the gas turbines will now be described.

The operation of the combined gas-steam cycle, i.e., the feeding of the tubes of the steam boilers CV with the exhaust gases of the turbines 11 is accomplished by admitting combustion air at high temperature and under high pressure. The combustion air heated for instance to 182° C. and admitted into the combustion chamber CC1 of the high-pressure turbine THP originates from two sources.

It originates first from an amount of external ambient air admitted for instance at 15° C. at 23 cooled successively to 5° C. in the exchanger 13, to −15° C. in the exchanger 14 and to −40° C. in the exchanger 20, and then compressed in the low-pressure stage CBP and then the medium-pressure stage CMP of the compressors.

In the exchanger 13, the heat is absorbed by the refrigerating unit Ref. In the exchanger 14, the heat is absorbed by an airflow introduced through a conduit 24 and proceeding from the tank Res. The compressed air contained in the tank Res and for instance at −50° C. is thus heated in the exchanger 14 for instance up to −30° C. and refrigerates the airflow admitted by the compressors. In the exchanger 20, the cooling affect is provided by the vaporization of the liquefied natural gas in the boiler-exchanger assembly 18–19.

The compressed air issuing in the hot state, for instance at 250° C., from the low-pressure stages of the compressor CBP leaves off its calories to the cool airflow proceeding from the tank Res. This airflow may thus be heated for instance to 210° C. The airflow withdrawn from the tank Res is advantageously controlled automatically by a motorized valve 25.

The air proceeding from the low-pressure stages CBP of the compressor and issuing from the exchanger 15, for instance at 10° C., is thereafter compressed in the medium-pressure stages CMP of the compressors, wherefrom it issues for instance at 154° C.

The two airflows proceeding from the compressors and from the tank are then mixed and form a total flow which is injected at 182° C. into the combustion chamber CC1.

The natural gas GN necessary for the combustion is delivered, (subsequent to vaporization in the boiler-exchanger assembly 18–19, for instance under a pressure of 50 atmospheres), to the two combustion chambers CC1 and CC2 of the turbine unit THP TBP. The natural gas admission is regulated so that the operating temperatures of both turbine stages are suitable.

The high-pressure stages THP may be fed for instance at 750° C. and the low-pressure stages TBP at 850° C.

The exhaust gases issuing from the turbine TBP, for instance at 400° C., may then be used directly as combustive gases injected into the tubes of the steam boilers CV of a steam cycle.

In this manner, the energy stored in the tank Res is better used, the thermodynamic efficiency of the compressors in particular being excellent under the said conditions.

Moreover, the cooling effects available from vaporization of the liquefied natural gas are also used very advantageously, while the storage of natural gas in liquid form enables the feeding of the turbines without using the normal feed network during the hours when the latter is overloaded.

b. second phase

It is now assumed that subsequent to a certain period of use of the plant, the tank Res has been emptied, the supply of power to the network being however continued. The diagram in FIG. 3 illustrates the operating principle under such operating conditions.

In the same manner as in FIG. 1, the atmospheric air is sucked at 21 by the low-pressure stages CBP of the compressors. Between the low-pressure stages CBP and the medium-pressure stages CMP of the compressors, a refrigeration is effected in the exchanger 16, for instance by means of water. The air issuing for instance at 278° C. from the stages CBP is admitted at 35° C. into the stages CMP. It issues therefrom under pressure at 140° C. and is injected at this temperature into the combustion chamber CC1 of the low-pressure turbine TBP of the unit 11.

Figure 3:
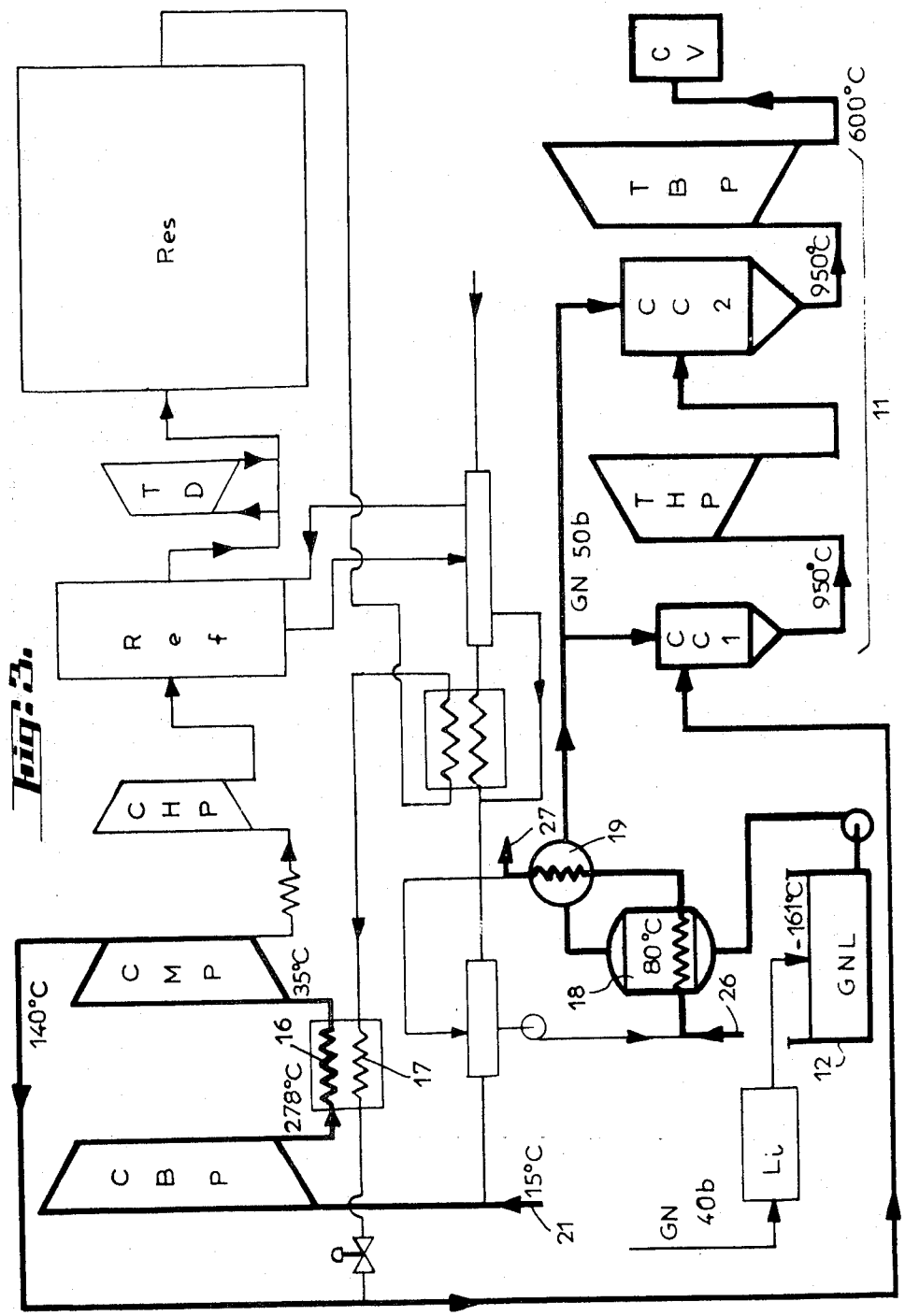
FIG. 3 illustrates the operation of the same plant during peak hours, i.e., usually by day, in a second phase subsequent to the emptying of the pressurized-air storage tank.

Owing to the fact that the mass rate of flow of the air is much lower in the diagram of FIG. 3 than that in the diagram of FIG. 2, the temperature in the turbines may be considerably increased and brought for instance to 950° C. for both high-pressure and low-pressure stages, as indicated in the diagram.

The natural gas under a pressure of 50 atmospheres is provided by the vaporization plant from the liquefied natural gas stored in the tank 12. The boilers 18 and 19 may be for instance heated by a water current entering at 26 and issuing at 27.

Owing to the considerable increase of the temperature of the gases operating in the turbines and admitted into the boilers CV, in this second phase of working of the plant, the latter is still capable of supplying a power which, although smaller than that the first phase of operation, still remains quite important.

c. intermediate phase

Of course, between the operation of the plant described in paragraph (a) hereabove (first phase) and the operation of the plant described in paragraph (b) (second phase) there are transitory operating conditions during which the tank may still provide air under a suitable pressure but at a relatively higher temperature. During this phase of operation, the exchanger 14 may be for instance shunted. Moreover, as the total airflow admitted into the turbines tends to decrease, the operating temperature of the turbines may be progressively increased.

Many modifications may be introduced into the mode of operation and the mounting just described. For instance, in the diagram of FIG. 3, the cooling effect resulting from the vaporization of the liquefied natural gas may be used to cool the air at the inlet of the low-pressure stages CBP of the compressors.

Moreover, the basic cycle used may be integrated in various mountings. For instance, the steam cycle may be replaced by any circuit ensuring the recovery of the latent heat of the exhaust gases.

The cycle may also be associated with a nuclear cycle, for instance a helium cycle. Under such conditions, a central station may be for instance, designed, having three purposes:

supply of a given basic power (supplied by the nuclear cycle),
a semibasic power supplied by the steam generating station,
a peak power supplied by the initial storage and refrigeration gas-plant used in combined cycle as described.

The plant just described may be operated for instance in the following manner: operation by night, during which the pressurized refrigerated air is stored as well as the liquefied natural gas, this phase of operation lasting for instance from 8 to 10 hours; operation by day, under peak conditions during a first phase which may last for instance 5 hours during which the compressed-air storage tank is almost emptied; operation by day, under reduced-load conditions, the compressed-air tank being empty and the plant operating in an autonomous manner. On the other hand, it is obvious that the time during which the available hours may be used under peak operating conditions of the plant may be chosen at will in daytime.

Of course, the invention is by no means limited to the forms of mounting and use described and illustrated, which have been given by way of example only, the invention comprising all technical means equivalent to the means described as well as their combinations, should the latter be carried out according to its spirit.

What is claimed is:

1. A method for generating power during peak-load hours and accumulating energy during minimum-load hours, of the type in which during minimum-load hours, air is compressed, refrigerated and then accumulated in storage tanks, and during peak hours power is recovered in turbines which are supplied with compressed air by said storage tanks, said method comprising: during peak hours, in a first phase of operation, low-pressure and medium-pressure stages of the air compressors, which are used in the accumulating period for the storing of compressed air in said storage tanks, are fed with external air which is first refrigerated by a counterflow of cold air proceeding from said storage tanks, the compressed hot air issuing from the low-pressure stages of the compressors ensuring counterflow heating, in an exchanger, of the said cold airflow proceeding from storage tanks, and thereafter the two pressurized airflows issuing in the hot state from the medium-pressure stages of the compressors and from the said exchanger proceeding from storage tanks are mixed and conveyed to said turbines where they are heated through combustion with suitable combustible, and then expanded, the hot gases issuing from the turbines being recovered to feed steam boilers with hot combustive gases.

2. Method according to claim 1 wherein during minimum-load hours, natural gas is liquefied and stored in the form of liquefied natural gas in a tank, and during peak hours said liquefied gas is vaporized to supply combustible to said turbines, the cooling effects of said vaporization being used to refrigerate said external airflow supplying said lower-pressure stage of the compressors after said first refrigeration of said flow by the counterflow of cold air proceeding from storage tanks.

3. Method according to claim 2, wherein the external airflow for supplying said compressors is refrigerated at its admission in the plant by the refrigerating unit used for refrigerating said compressed air before its storing in said storage tanks.

4. Method according to claim 1, wherein the turbines are divided into a high-pressure and a low-pressure stage with a combustion chamber before each stage and, subsequent to the emptying of the air tank, the low-pressure and medium-pressure stages of the compressors are fed with uncooled external air, and the temperatures in the turbines are allowed to increase to their maximum limit, which is higher than that of the said first phase of operation, owing to the reduced airflow admitted into the said turbines and to the corresponding reduced discharge from the latter.

5. A plant for generating power during peak-load hours and accumulating energy during minimum-load hours, of the type comprising gas turbines, compressors, a refrigeration unit and a refrigerated pressurized-air storage tank, and wherein the tank ensures feeding of the turbines during the power generation period, whereas during the energy storage period the compressors and the refrigerating unit feed the tank with pressurized cold air, said plant comprising: low-, medium- and high-pressure stages of compressors, counterflow heat exchangers, respectively a first heat exchanger between the air admission circuit of the low-pressure stage of the compressors and the discharge circuit of said storage tank, and a second heat exchanger between the medium-pressure stage of the compressors and the discharge circuit of said storage tank downstream of said first heat exchanger, a mixing circuit for the hot air discharged from said medium-pressure stage of the compressors and the air issuing from said storage tanks and heated in said two successive heat exchangers, said mixing circuit supplying with hot compressed air said turbines, a circuit supplying said turbines with combustible, and a discharge circuit for the hot gases issuing from the turbines for supplying steam boilers.

6. Power generating plant according to claim 5 comprising means for liquefying natural gas and storing the same, means for vaporizing and supplying said liquefied gas to the turbines, said means for vaporizing said liquefied gas comprising heat exchangers which deliver to the airflow admitted at the inlet of the low-pressure stage of the compressors the cooling effects available as a result of the vaporization of said liquefied natural gas used as said combustible feeding the turbines.

* * * * *